United States Patent
Junge et al.

(10) Patent No.: US 11,841,591 B2
(45) Date of Patent: Dec. 12, 2023

(54) SWITCHABLE WINDOW ELEMENT

(71) Applicant: Merck Patent GmbH, Darmstadt (DE)

(72) Inventors: Michael Junge, Pfungstadt (DE); Andreas Beyer, Hanau (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 17/312,043

(22) PCT Filed: Dec. 11, 2019

(86) PCT No.: PCT/EP2019/084566
§ 371 (c)(1),
(2) Date: Jun. 9, 2021

(87) PCT Pub. No.: WO2020/120533
PCT Pub. Date: Jun. 18, 2020

(65) Prior Publication Data
US 2022/0026770 A1    Jan. 27, 2022

(30) Foreign Application Priority Data
Dec. 13, 2018  (EP) .................................... 18212234

(51) Int. Cl.
*G02F 1/1343*    (2006.01)
*G02F 1/1335*    (2006.01)
(Continued)

(52) U.S. Cl.
CPC .......... *G02F 1/134363* (2013.01); *E06B 9/24* (2013.01); *G02F 1/133545* (2021.01); *G02F 1/133769* (2021.01); *E06B 2009/2464* (2013.01)

(58) Field of Classification Search
CPC ......... G02F 1/134363; G02F 1/133545; G02F 1/133769; G02F 1/133742; G02F 1/13712;
(Continued)

(56) References Cited

U.S. PATENT DOCUMENTS 4,957,349 A * 9/1990 Clerc ..................... H04N 3/127
349/181
6,816,218 B1 * 11/2004 Coates .............. G02F 1/133719
349/123

(Continued)

FOREIGN PATENT DOCUMENTS

| EP | 1378558 A1 | 1/2004 |
| EP | 3260913 A1 | 12/2017 |

(Continued)

OTHER PUBLICATIONS

R. Baetens et al., „Properties, requirements and possibilities of smart windows for dynamic daylight and solar energy control in buildings: A state-of-the art review, Solar Energy Materials & Solar Cells, 94 (2010), pp. 87-105.
(Continued)

*Primary Examiner* — Donald L Raleigh
(74) *Attorney, Agent, or Firm* — MILLEN, WHITE, ZELANO & BRANIGAN, PC; Ryan Pool

(57) ABSTRACT

A switchable window element with a layer structure comprising a switchable layer, two polarizers and two optical retarders; wherein a first polarizer and a first optical retarder are arranged in an optical path prior to the switchable layer and a second polarizer and a second optical retarder are arranged in the optical path after the switchable layer wherein the switchable layer is a vertically aligned liquid crystal layer comprising a liquid crystalline medium and wherein the product of the thickness d of the switchable layer and the optical anisotropy Δn of the liquid crystalline
(Continued)

Fig. 2 medium is in the range of from 0.05 μm to 3.0 μm and the liquid crystalline medium has a clearing point of at least 70° C.

12 Claims, 4 Drawing Sheets

(51) Int. Cl.
*G02F 1/1337* (2006.01)
*E06B 9/24* (2006.01)

(58) Field of Classification Search
CPC .. G02F 1/1393; G02F 1/13363; G02F 1/1337; G02F 2413/02; E06B 9/24; E06B 2009/2464
See application file for complete search history.

(56) References Cited

U.S. PATENT DOCUMENTS

| | | | |
|---|---|---|---|
| 10,663,828 B2 | 5/2020 | Lim et al. | |
| 2005/0068629 A1* | 3/2005 | Fernando | B32B 17/10036 359/609 |
| 2006/0106271 A1 | 5/2006 | Hubbers et al. | |
| 2006/0119775 A1* | 6/2006 | Nakata | G02F 1/1335 349/119 |
| 2009/0167971 A1* | 7/2009 | Powers | G02B 13/0045 349/18 |
| 2010/0315693 A1* | 12/2010 | Lam | G02F 1/0018 359/275 |
| 2015/0293390 A1* | 10/2015 | Tsunekawa | B32B 7/023 349/12 |
| 2016/0017226 A1* | 1/2016 | Fujisawa | G02F 1/134363 349/33 |
| 2016/0377781 A1* | 12/2016 | Park | B32B 27/365 349/194 |
| 2017/0371186 A1 | 12/2017 | Junge et al. | |
| 2018/0022997 A1 | 1/2018 | Graziano et al. | |
| 2020/0224098 A1* | 7/2020 | Mamiya | G02F 1/1337 |
| 2021/0071473 A1* | 3/2021 | Kwon | G02F 1/13363 |

FOREIGN PATENT DOCUMENTS

| | | | | |
|---|---|---|---|---|
| EP | 3279723 A1 | 2/2018 | | |
| KR | 101920854 B1 * | 11/2018 | ....... | G02F 1/133528 |
| KR | 101920854 B1 | 11/2018 | | |
| WO | 2015117736 A1 | 8/2015 | | |
| WO | WO-2018221236 A1 * | 12/2018 | ............. | C09K 19/12 |

OTHER PUBLICATIONS

Seung-Hoon Ji et al., "An optical configuration for vertical alignment liquid crystal cell with wide viewing angle", Journal of Information Display, 9 (2008) pp. 22-27.

Office action in corresponding EP 19813900.8 dated Mar. 10, 2023 (pp. 1-6).

* cited by examiner

SWITCHABLE WINDOW ELEMENT

The invention relates to a switchable window element comprising a switchable layer. Further aspects of the invention relate to the use of such a switchable window element as a window for a building or a vehicle.

Smart windows which comprise switchable window elements allow the control of transmission of light through the window by means of a control signal. Such smart windows are known in the art.

The review article by R. Baetens et al. "Properties, requirements and possibilities of smart windows for dynamic daylight and solar energy control in buildings: A state-of-the-art review", Solar Energy Materials & Solar Cells 94 (2010) pages 87-105 describes tintable smart windows. Smart windows can make use of several technologies for modulating the transmittance of light such as devices based on electrochromism, liquid crystal devices and electrophoretic or suspended-particle devices. Liquid crystal-based devices employ a change in the orientation of liquid crystal molecules between two conductive electrodes by applying an electric field which results in a change of their transmittance.

When a window element is used as a window in a building or a vehicle, it is desirable that the transmission of light is uniform and not dependent on the viewing angle.

The article of Seung-Hoon Ji and Gi-Dong Lee (2008), "An optical configuration for vertical alignment liquid crystal cell with wide viewing angle", Journal of Information Display, 9:2, 22-27, DO1:10.1080/15980316.2008.9652054 discloses an optical configuration for a vertical alignment liquid crystal cell for use in displays comprising a combination of retardation plates. Retardation plates are arranged in the optical path before and after a vertically aligned liquid crystal layer. The retardation plates compensate for phase dispersion so that light leakage is reduced and a wide viewing angle is obtained.

EP 3 260 913 A1 discloses an optical switching device comprising a polarization layer and a switching layer. The switching layer comprises a liquid-crystalline material and a dichroic dye compound. The switching layer comprises a bright state and a dark state.

It is an object of the invention to provide a window element, wherein the transmission of light through the window element has a reduced dependency on the viewing angle.

A switchable window element having a layer structure is proposed. The layer structure comprises a switchable layer, two polarizers and two optical retarders, wherein a first polarizer and a first optical retarder are arranged in an optical path prior to the switchable layer and a second polarizer and a second optical retarder are arranged in the optical path after the switchable layer. Further, the switchable layer is a vertically aligned liquid crystal layer comprising a liquid crystalline medium, wherein the product of the thickness d of the switchable layer and the optical anisotropy $\Delta n$ of the liquid crystalline medium is in the range of from 0.05 μm to 3.0 μm and the liquid crystalline medium has a clearing point of at least 70° C.

The switchable window element preferably comprises a dark state in which light is absorbed by the switchable window element and a bright state in which light may be transmitted through the switchable window element. Switching between the states is achieved by applying an electric field to the switchable layer.

In some embodiments the bright state may optionally be configured as a mode in which the liquid crystalline medium is twisted in a range from 0° to 360°, in particular in the presence of an applied electric field. The liquid crystalline medium may optionally comprise one or more chiral compounds, in particular one or more chiral dopants.

Preferably, the overall transmission $\tau_v$ of visible light through the switchable window element is switchable in a range of from 0% to 47% and more preferred in a range of from 2% to 37%. In the bright state, the transmission $\tau_v$ of visible light through the switchable window element is preferably better than 20% and more preferably better than 25%. In the dark state, the transmission of visible light through the switchable window element is preferably less than 5%, more preferably less than 2% and especially preferred less than 1%. Visible light has a wavelength of from 380 to 780 nm. The transmission $\tau_v$ of visible light is measured in accordance with EN 410:2011-04.

Advantageously the switchable window element has a reduced dependency on the viewing angle, which in particular can minimize or even prevent undesirable light leakage in the dark state or unwanted colour shifts.

The switchable layer is a vertically aligned liquid crystalline layer. The molecules of the liquid crystalline medium are aligned perpendicular to the substrate surface and are switched parallel to the plane of the layer structure by the application of an electric field that is perpendicular to the plane. The liquid crystalline medium has a negative dielectric anisotropy that is aligned perpendicular to the electric field.

Examples for suitable liquid crystalline media having a negative dielectric anisotropy are given in EP 1 378 558 A1. The liquid crystalline medium may include additives. In particular, the liquid crystalline medium preferably includes an antioxidant in a concentration of at least 5 ppm.

The liquid-crystalline medium furthermore preferably has an optical anisotropy ($\Delta n$) of 0.03 to 0.3 for light having a wavelength of 589.3 nm, particularly preferably 0.04 to 0.27. The liquid-crystalline material likewise preferably has a dielectric anisotropy $\Delta\varepsilon$ of –0.5 to –20, preferably of –1.5 to –10.

The product of the thickness d of the switchable layer and the optical anisotropy $\Delta n$ of the liquid crystalline medium is in the range of from 0.05 μm to 3.0 μm, preferably in the range of from 0.2 μm to 0.4 μm. For example the product is 0.3 μm.

All physical properties and physicochemical or electro-optical parameters are determined by generally known methods, in particular according to "Merck Liquid Crystals, Physical Properties of Liquid Crystals", Status November 1997, Merck KGaA, Germany and are given for a temperature of 20° C., unless explicitly stated otherwise.

Above and below, $\Delta n$ denotes the optical anisotropy, wherein $\Delta n=n=n_e-n_o$, and $\Delta\varepsilon$ denotes the dielectric anisotropy, wherein $\Delta\varepsilon=\varepsilon_\parallel-\varepsilon_\perp$. The dielectric anisotropy $\Delta\varepsilon$ is determined at 20° C. and 1 kHz. The optical anisotropy $\Delta n$ is determined at 20° C. and a wavelength of 589.3 nm.

The liquid-crystalline medium of the switching layer preferably has a nematic phase at the operating temperature of the switchable window element. It is particularly preferably nematically liquid-crystalline in a range of +−20° C., very particularly preferably in a range of +−30° C. above and below the operating temperature of the switchable window. The operating temperature of the switchable window element is preferably from −20° C. to 70° C.

The liquid-crystalline medium furthermore preferably has a clearing point in the range of from 70° C. to 170° C., preferably above 80° C., more preferably above 100° C., particularly preferably above 105° C., very particularly preferably above 110° C., and most preferably above 115° C. Higher clearing points are even more preferred, in particular a clearing point of above 120° C. and more preferred 130° C. The clearing point marks the temperature at which a phase transition from a nematically liquid-crystalline state to an isotropic state occurs.

The clearing point, in particular the phase transition temperature between the nematic phase and the isotropic phase, can be measured and determined by commonly known methods, e.g. using a Mettler oven or a hot-stage under a polarizing microscope, and herein preferably is determined using a Mettler oven.

The first and second polarizers are preferably configured as linear polarizers which transmit light of a first linear polarization and absorb and/or reflect light of the respective orthogonal second linear polarization. Suitable polarizers are, for example, available from Polatechno Co., Ltd.

In a first configuration of the switchable window element, the first and second polarizers have the same orientation with respect to each other such that they both transmit light of the same linear polarization. In a second configuration of the switchable window element, the first and second polarizers are configured in a crossed configuration with respect to each other such that the linear polarization which is transmitted by the first polarizer is absorbed and/or reflected by the second polarizer and vice versa.

When no voltage and thus no electrical field is applied, the homeotropic orientation of the liquid crystalline medium does not affect the polarization plane of the transmitted light such that a bright state is produced for the first configuration of the switchable window element (normally bright) and a dark state is produced for the second configuration of the switchable window element (normally dark).

Preferably, the first configuration is selected if a bright state of the window element is desired as a failsafe state and the second configuration is preferably selected if a dark state of the window element is desired as a fail-safe state. The switchable window element is in the failsafe state when no voltage and thus no electrical field is applied.

Optical retarders are arranged in the optical path before and after the vertically aligned liquid crystal layer. The optical retarders compensate for phase dispersion so that light leakage, especially in the dark state, is reduced and a low dependency of the transmission on the viewing angle is obtained. The optical retarders in principle have a slow axis and linear polarized light having a polarization parallel to the slow axis is retarded relative to light of the orthogonal linear polarization.

Preferably, the first optical retarder and/or the second optical retarder is configured as a first/second retardation element having a layer structure comprising an optically isotropic substrate and a retardation layer. Additionally, the first and/or second retardation element may include a first/second polarizing layer, respectively, so that a combined polarizing and retardation element is formed.

The optically isotropic substrate is preferably selected from a glass or a transparent polymer. Examples for a suitable glass include, for example, alkaline earth boro-aluminosilicate glass, chemically toughened glass, aluminosilicate glass, borosilicate glass and soda lime glass. Examples for suitable transparent polymers include polycarbonate (PC), cyclo-olefin polymer (COP), polyethylene terephthalate (PET), polyimide and polyethylene naphthalate (PEN).

Alternatively, the first optical retarder and/or the second optical retarder is configured as a first/second retardation element having a layer structure which preferably comprises an optically anisotropic substrate and a retardation layer.

In an alternative variant, the first optical retarder and/or the second optical retarder preferably consists of an optically anisotropic substrate.

The use of an optically anisotropic substrate is advantageous, as the substrate can be used both for providing mechanical stability and compensation of phase dispersion in a single element.

Examples for suitable optically anisotropic substrates include polyethylene terephthalate (PET), cellulose triacetate (TAC) and polycarbonate (PC). Anisotropic optical properties of polymers may, for example, be obtained by mechanical biaxial stretching which causes a preferential orientation of the macromolecular chains in the polymers.

In a further embodiment, it is also possible to use anisotropic substrates which have an extremely large birefringence such that they exhibit quasi-isotropic optical behaviour.

In embodiments, wherein the first and/or second retardation element comprises or consists of an optically isotropic or anisotropic substrate, the respective substrate of the retardation element preferably also serves as substrate for the liquid crystal cell and the optically (an)isotropic substrate faces towards the cell gap. Any order of retardation layer and substrate layer in a retardation element being a layer structure is possible. Further, different embodiments of retardation elements may be combined in a switchable window element, wherein, for example, the first retardation element comprises an optically isotropic substrate and the second retardation element comprises an optically anisotropic substrate.

If no substrate is provided as part of a retardation element or another functional element of the switchable window element, it is preferred to provide two optically isotropic substrates which form the liquid crystal cell.

Preferably, the first retardation element and/or the second retardation element has an absolute value of an out of plane retardation Rth of from 1 nm to 1000 nm, preferably of from 50 nm to 500 nm. Additionally or alternatively, the retardation element has an absolute value of an in plane retardation Re of from 1 to 300 nm, preferably of from 5 nm to 70 nm.

The exact out of plane and/or in plane retardation is preferably selected within these ranges such that phase dispersion of light passing through one or more layers and/or elements of the layer structure is compensated. In particular, it is preferred to set the out of plane retardation and the in plane retardation of the first and second optical retarder such that for the switchable layer set to the bright state, light having passed through the first polarizer layer, the first optical retarder, the switchable layer and the second optical retarder is linear polarized, wherein the polarization is parallel to the orientation of the second polarizer. In case the switchable layer is set to the dark state, light having passed through the first polarizer layer, the first optical retarder, the switchable layer and the second optical retarder is linear polarized, wherein the polarization is orthogonal to the orientation of the second polarizer.

The Re and Rth values of a retardation element or retardation layer can, for example, be determined by using an automatic birefringent analyzer. Such an automated analyzer is, for example available under the trade name KOBRA-21ADH by Oji Scientific Instruments. The analysis of the retardation is preferably performed at a wavelength of 590 nm.

The required retardation may be determined by measuring the phase dispersion of the respective layers/elements of the layer structure. Additionally or alternatively, a model of the layer structure may be used to calculate the required Re and Rth values for compensating the phase dispersion.

Several functional layers of the layer structure may be provided as a combined element. For example, a polarizer and an optical retarder may be provided in the form of a combined element which provides the functionality of a polarizer and an optical retarder.

Further, the substrate layers, especially optically isotropic substrate layers, may be provided separate from the polarizers and/or optical retarders. In particular, it is possible to provide a polarizer and an optical retarder as a combined element which is then applied to an optically isotropic substrate of a liquid crystal cell.

In a preferred embodiment in the switchable window element one or more antireflective coatings may be applied to one or more of the provided layers and/or substrates in order to reduce and minimize unwanted reflection of light.

In order to form a liquid crystal cell, the switchable layer is sandwiched between two substrate layers defining a cell gap. The substrates are preferably optically transparent and may be rigid or flexible. Preferably, one of the functional layers or elements of the layer structure serves as a substrate layer. For example, an optical retarder and/or a polarizer may serve as substrate. The two substrates are arranged such that a cell gap is formed between the two substrates. The cell gap is preferably between 1 µm and 35 µm wide and more preferably between 2 µm and 30 µm. The switchable layer is located inside the cell gap. Accordingly, the switchable layer preferably has a thickness d between 1 µm and 35 µm.

To maintain a proper thickness d of the switchable layer, spacers may be included within the cell gap of the switchable layer. Typically, the spacers have a spherical shape with a diameter in the range of the cell gap. For example, non-conductive spacers having a spherical shape with a predetermined diameter made of polymer or glass may be used. In some embodiments it may be useful to provide sticky spacers, i.e. spacers which have some intrinsic adhesive characteristic to better adhere to the surface. It may also be useful to use black spacers, e.g. to avoid or minimize undesired light leakage. In some embodiments it can be especially beneficial to use spacers which are black and sticky. Alternatively, the cell thickness may be set or maintained by other suitable means, e.g. by using column spacers. The column spacers may also be formed to give compartments, thus optionally allowing for free-cuttable structures. In some embodiments the switchable layer may thus comprise segregated compartments which each contain the liquid crystalline medium, e.g. using rectangular or honeycomb structures.

In combination with flexible substrates, thinner switchable layers are preferred as the application of thinner switchable layers results in more stable devices, in particular undesired movement of the spacers relative to the substrate layers occurs less easily.

In order to apply an electric field to the switchable layer, two electrodes are preferably provided. An electric field is generated between the two electrodes by applying a voltage to the electrodes, for example by means of a driving signal. Preferably, the electrodes are transparent electrode layers, wherein the switchable layer is arranged between two transparent electrode layers. A power supply apparatus which may include a driving signal generator and cables may be used to supply the voltage to the electrodes.

The transparent electrode is, for example, based on a thin layer of indium tin oxide (ITO). The electrodes are preferably applied to the two substrates and are arranged such that the transparent electrodes face each other.

Preferably, the layer structure of the switchable window element comprises in this order a first polarizer layer, a first retardation element, a first electrode layer, a first alignment layer, the switchable layer, a second alignment layer, a second electrode layer, a second retardation element, and a second polarizer layer.

Preferably, the first alignment layer and/or second alignment layer is a homeotropic alignment layer. The homeotropic alignment layer is preferably a polyimide-based layer.

In a vertically aligned liquid crystal layer, the liquid crystal molecules are orientated such that the director is perpendicular, or essentially perpendicular, to the plane of the layer structure. Preferably, a small pretilt angle, e.g. 1° to 2°, for the alignment of the liquid crystal layer is set such that the homeotropic alignment slightly deviates from 90°, e.g. by obtaining orientation angles of 88° to 89°. The pretilt angle may be influenced by means of the alignment layer. A pretilt angle of about 90° may be achieved, for example, by incorporating polyhedral oligomeric silsesquioxane (POSS) nanoparticles in the polyimide alignment layer. This and further methods for controlling the pretilt angle are, for example, described in the publication "Controlling the Alignment of Polyimide for Liquid Crystal Devices", Shie-Chang Jeng and Shug-June Hwang, Dec. 19, 2012, DOI 10.5772/53457.

In a preferred embodiment polymer-stabilized vertical alignment (PS-VA) is used.

In alternative embodiments of the switchable window element, a self-aligned vertical alignment (SA-VA) liquid crystal layer is used. In such an embodiment, no alignment layers are required and the layer structure preferably comprises in this order the first polarizer layer, the first retardation element, the first electrode layer, the switchable layer, the second electrode layer, the second retardation element, and the second polarizer layer.

In SA-VA liquid crystalline media, small amounts of additives are doped to provide the vertical alignment function by the liquid crystalline media itself without the need of alignment layers such as polyimide layers on the substrate surfaces. The SA-VA additive material comprises two main parts—anchoring group and the core structure. The anchoring part binds to the substrate surface vertically so that no further alignment layer is required.

The switchable window element may be a planar window element.

Alternatively, the switchable window element may be curved in space. For example, the switchable window element may be bent along a single direction so that the window element has a single radius of curvature. In another example, the switchable window element is curved along two directions, wherein the radii of curvature may be identical or different for each of the two directions.

In order to provide further mechanical strength, the switchable window element preferably comprises at least one further substrate and at least one interlayer, wherein the at least one further substrate is connected to the first polarizer layer and/or second polarizer layer by means of the at least one interlayer.

The further substrate is preferably optically transparent and may be selected from a polymer or a glass.

Suitable glass materials for the further substrate include, for example, float glass or downdraw glass. The glass may also have been subjected to a pre-processing step like tempering, toughening and/or coating or sputtering. The glass can be, for example, soda-lime glass, borosilicate glass or aluminosilicate glass.

For lamination, a lamination sheet (interlayer) is arranged between the at least one sheet and the switchable window element. In a subsequent treatment, which usually involves application of heat and/or elevated pressure, the at least one sheet, the interlayer and the switchable window element are bonded.

Suitable lamination sheets include, for example, an ionoplast, ethylene vinyl acetate (EVA), polyvinyl butyral (PVB) or thermoplastic polyurethane (TPU).

A suitable ionoplast is available under the trade name SentryGlas.

Alternatively, the at least one sheet and the at least one switchable window element may be bonded by applying an adhesive at the interface between the second side of the sheet and the first substrate layer.

The switchable window element is preferably combined with further components, such as a window frame, to form a switchable window.

Preferably, the switchable window element is used as a sunroof or a back window of a vehicle, wherein the switchable window element is configured to be normally dark. By configuring the window element to be in the dark state when no electric field is applied, the switchable window element may protect from bright sunlight in case no driving signal may be applied, for example due to a power failure.

Further, the switchable window element is preferably used as a windshield or window of a vehicle or a window of a building, wherein the switchable window element is configured to be normally bright. By configuring the window element to be in the bright state when no electric field is applied, the switchable window element allows an unblocked view out of the window in case no driving signal may be applied, for example due to a power failure.

Owing to the excellent dark state the device can e.g. serve as a switchable blind or screen or respectively as a sun shield in architectural or automotive applications. By optionally providing segmentation of the window element spatially selective or partial dimming may be obtained.

BRIEF DESCRIPTION OF THE DRAWINGS

The drawings show:

FIG. 1 shows a first embodiment of a switchable window element 10. The switchable window element 10 has a layer structure which comprises in this order a first polarizer layer 12, a first retardation element 14, a first electrode layer 16, a first alignment layer 18, a switchable layer 20, a second alignment layer 22, a second electrode layer 24, a second retardation element 26 and a second polarizer layer 28. The first and second electrode layers 16, 24 are, for example, based on a thin layer of indium tin oxide (ITO).

Depending on the configuration of the switchable window element 10, the first and second polarizer layers 12, 28 may be arranged in parallel or in crossed configuration. In crossed configuration, the window element 10 is normally dark. In parallel configuration, the window element 10 is normally bright.

Figure 1:
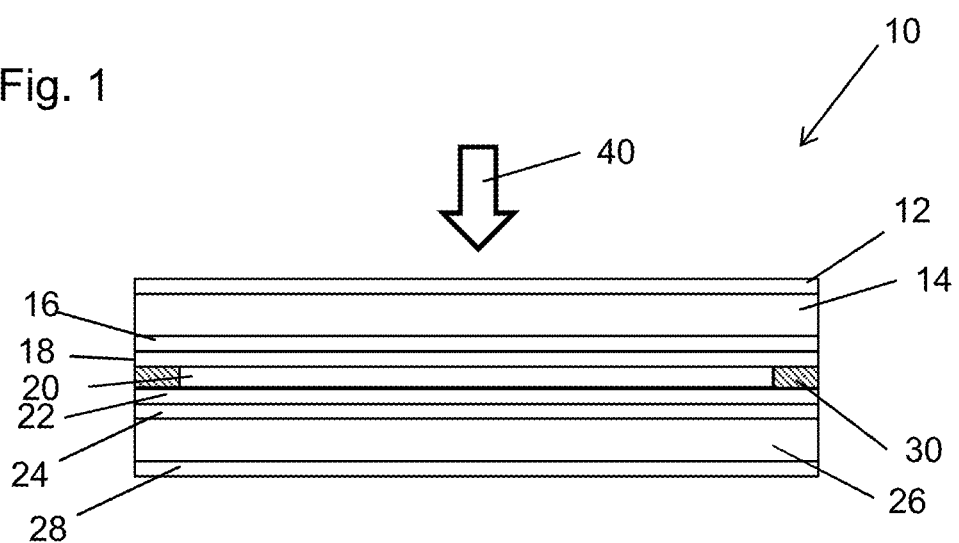
FIG. 1 a first embodiment of a switchable window element.

In the embodiment of FIG. 1, the first retardation element 14 and the second retardation element 26 serve as substrates for a liquid crystal cell. The first retardation element 14 carries the first electrode layer 16 and the first alignment layer 18 and the second retardation element 26 carries the second electrode layer 24 and the second alignment layer 22. The retardation elements 14, 26 of the first embodiment are configured as optically anisotropic substrates which provide both mechanical stability and compensation for phase dispersion in a single element.

The two substrates are arranged such that a liquid crystal cell having a cell gap is formed. The switchable layer 20 is sandwiched between the two substrates, wherein the two alignment layers 18 and 22 are facing towards the switchable layer 20. A seal 30 closes the cell.

The switchable layer 20 is a vertically aligned liquid crystal layer which comprises a liquid crystalline medium having a negative dielectric anisotropy $\Delta\in$. For achieving the vertical alignment with a pretilt angle of about 90°, the alignment layers 18 and 22 are configured as homeotropic polyimide based alignment layers.

Light, which passes through the switchable window element 10 along an optical path 40 is first linear polarized by the first polarizer layer 12. The light then passes through the first retardation element 14. Depending on the state of the switchable layer 20, the linear polarization plane of the light is unaffected or rotated by about 90°. After the switchable layer 20, the light passes through the second retardation element 26 and then through the second polarizing layer 28.

The out of plane and/or in plane retardation of the two retardation elements 14, 26 is selected such that phase dispersion of light passing through the layers 12, 16, 18, 20, 22, 24 and elements 14, 26 of the layer structure is compensated. In particular, the out of plane retardation and the in plane retardation of the first and second retardation element 14, 26 are set such that for the switchable layer 20 set to the bright state, light having passed through the first polarizer layer 12, the first retardation element 14, the switchable layer 20 and the second retardation element 26 is linear polarized, wherein the polarization is parallel to the orientation of the second polarizer layer 28. In case the switchable layer 20 is set to the dark state, light having passed through the first polarizer layer 12, the first retardation element 14, the switchable layer 20 and the second retardation element 26 is linear polarized, wherein the polarization is orthogonal to the orientation of the second polarizer layer 28.

Figure 2:
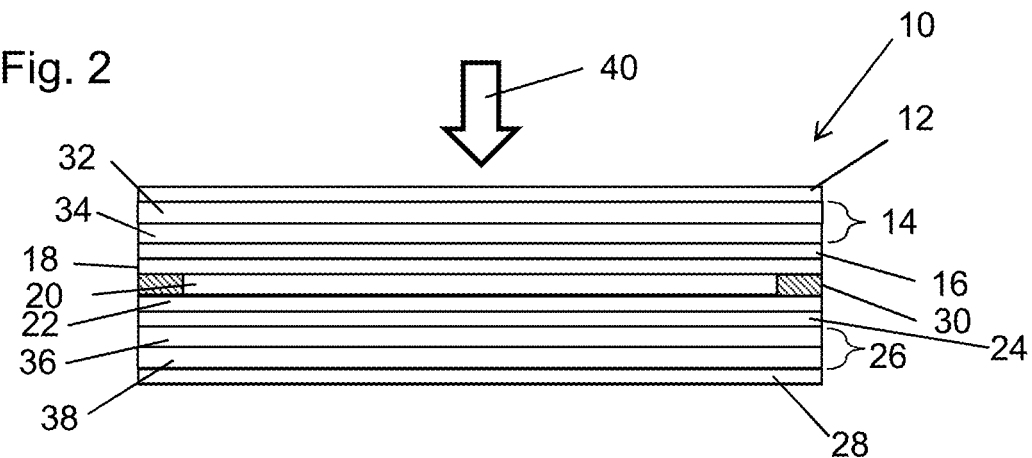
FIG. 2 a second embodiment of the switchable window element.

FIG. 2 shows a second embodiment of the switchable window element 10. The switchable window element 10 of FIG. 2 has the same layer structure as the switchable window element 10 of the first embodiment which was described with respect to FIG. 1. The switchable window element 10 of the second embodiment has a layer structure which comprises in this order the first polarizer layer 12, the first retardation element 14, the first electrode layer 16, the first alignment layer 18, the switchable layer 20, the second alignment layer 22, the second electrode layer 24, the second retardation element 26 and the second polarizer layer 28.

In the second embodiment shown in FIG. 2, the first retardation element 14 is a layer structure comprising a first retardation layer 32 and a first substrate layer 34. Likewise, the second retardation element 26 is a layer structure comprising a second retardation layer 38 and a second substrate layer 36. In the second embodiment, the substrate layers 34, 36 of the retardation elements 14, 26 face towards the switchable layer 20.

The configuration of the retardation elements 14, 26 as a layer structure allows the use of both optically isotropic and anisotropic substrates. The substrate may be chosen primarily for providing the required mechanical properties as the substrate layers 34, 36 may only provide no or only a part of the required total retardation. The remaining amount of retardation is provided by the first and second retardation layers 32, 38 which must not fulfill mechanical stability requirements by their own and can therefore be chosen only in dependence on the required retardation.

Figure 3:
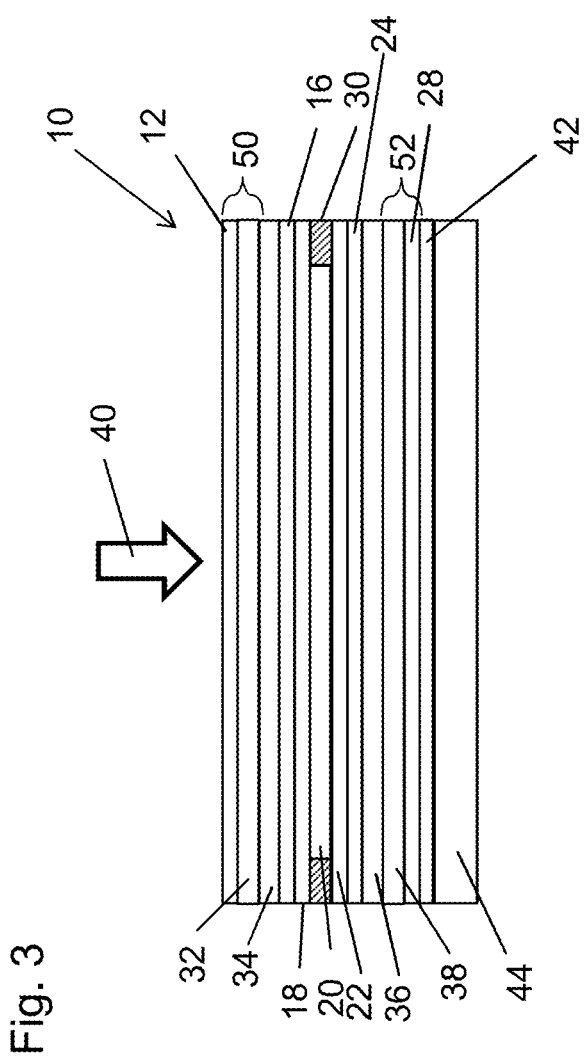
FIG. 3 a third embodiment of the switchable window element.

FIG. 3 shows a third embodiment of the switchable window element 10. The switchable window element 10 of FIG. 3 has essentially the same layer structure as the switchable window element 10 of the second embodiment which was described with respect to FIG. 2. However, the first polarizer element 12 and the first retardation layer 32 are provided in form of a first combined polarizer-retarder element 50 and the second polarizer element 28 and the second retardation element 38 are provided in form of a second combined polarizer-retarder element 52.

This structure allows the use of optically isotropic substrates 34 and 36 which, in combination with the first and second electrode layers 16, 24, the first and second alignment layers 18, 22 and the switchable layer 20 form a liquid crystal cell. This liquid crystal cell may be prepared in a first step and the combined polarizer-retarder elements 50, 52 may be applied at a later step.

In addition, the switchable window element 10 of the third embodiment comprises a further substrate 44 and an interlayer 42.

The further substrate 44 is included in order to provide further mechanical strength. In the embodiment shown in FIG. 3, the further substrate 44 is connected to the second polarizer layer 28 by means of the interlayer 42. Alternatively or additionally, a further substrate 44 may be connected to the first polarizer layer 12. The further substrate 44 is preferably optically transparent and may be selected from a polymer or a glass.

EXAMPLE

An inventive vertically aligned liquid crystal cell is prepared wherein the product of the thickness d of the switchable layer and the optical anisotropy Δn of the liquid crystalline medium was set to 0.3 μm. The cell gap d was set to 3.45 μm. Two polarizer foils which additionally comprise retardation elements provided by Polatechno Co., Ltd. were used as first and second polarizing layer and first and second retardation elements. The combined polarizer and retarder foils were applied to optically isotropic substrates forming the liquid crystal cell.

A liquid crystal cell having a Heilmeier configuration was used as comparative example. In a Heilmeier cell, a guest-host system is used as switchable layer which comprises at least one liquid crystal as host and a dichroic dye as guest. When the LC molecules change their orientation due to an applied electric field, the orientation of the dichroic dye is changed as well. The dichroic dye absorbs, or respectively preferentially absorbs, light in one orientation so that light transmission may be modulated by changing the orientation of the dichroic dye. In the comparative example, a configuration using one polarizer and one liquid crystal cell was used.

Figure 4A:
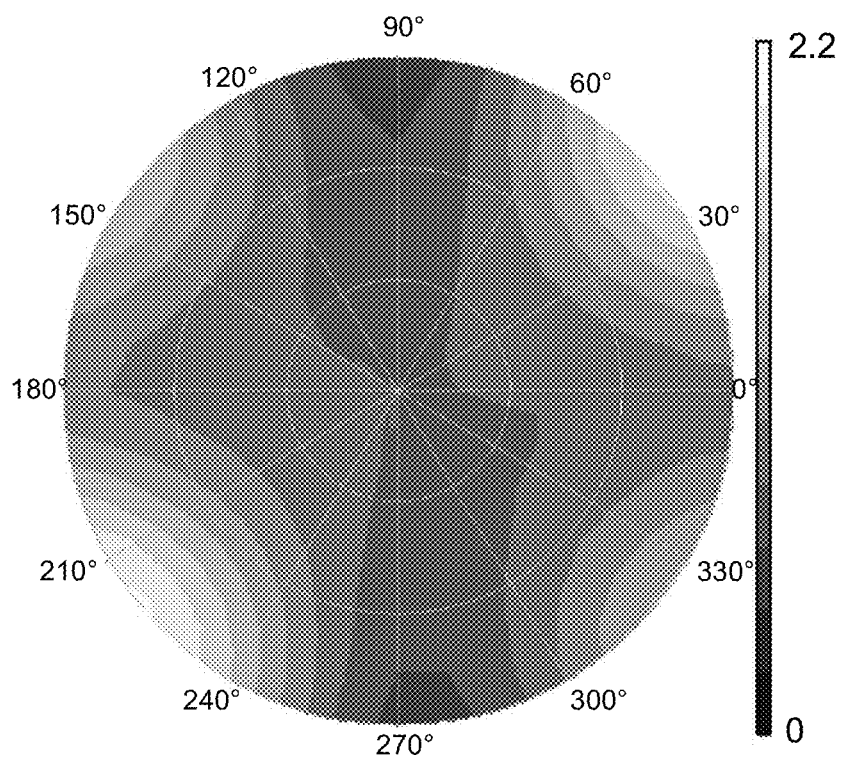
FIG. 4*a* the angle dependence of the dark state for a state of the art window element, FIG. 4*b* the angle dependence of the dark state for an inventive window element, FIG. 5*a* the angle dependence of the bright state for a state of the art window element, and FIG. 5*b* the angle dependence of the bright state for an inventive window element.
Figure 4B:
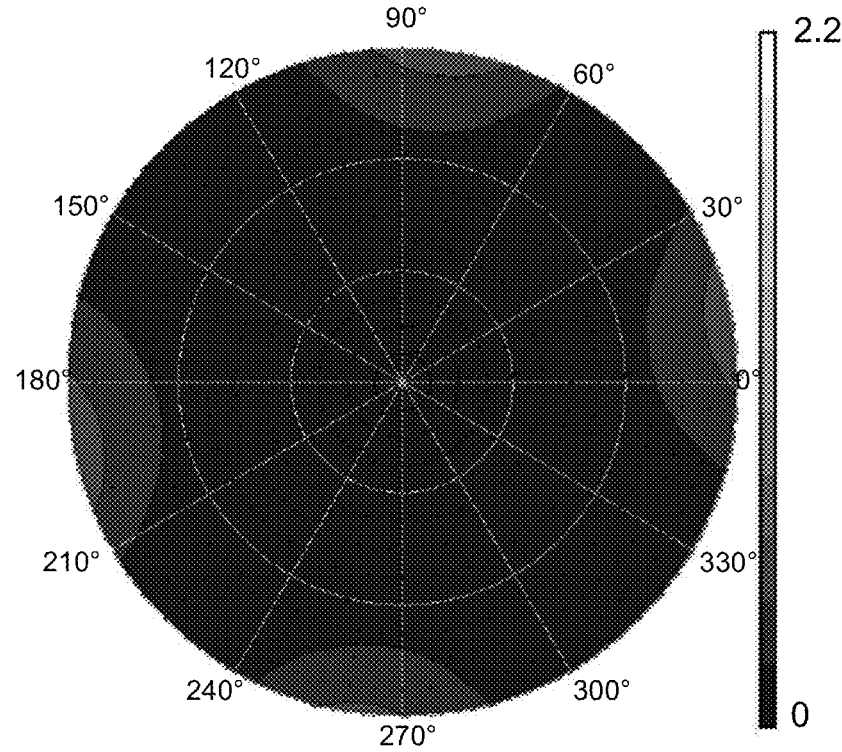

The angle dependent transmission of the inventive cell and the Heilmeier cell was determined for the dark state and the bright state. The transmission in the dark state is shown in FIGS. 4a and 4b. FIG. 4a shows the dark state transmission of the Heilmeier cell and FIG. 4b shows the dark state transmission of the inventive switchable window element having a vertically aligned liquid crystal layer. The inventive switchable window element provides an improved dark state having less transmission and less angle dependence than the Heilmeier cell.

Figure 5A:
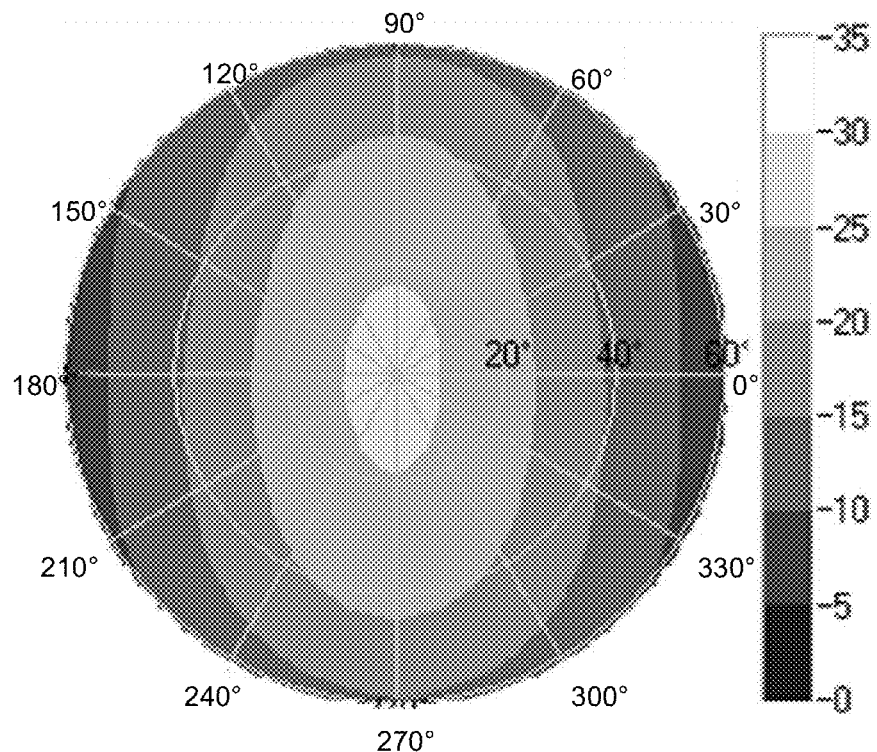
Figure 5B:
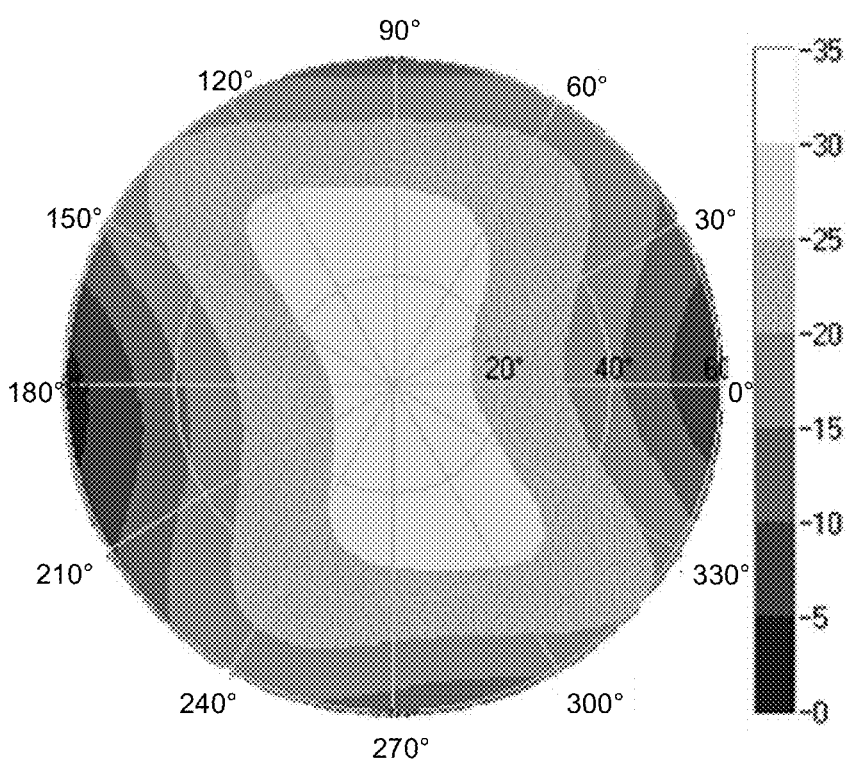

The transmission in the bright state is shown in FIGS. 5a and 5b. FIG. 5a shows the bright state transmission of the Heilmeier cell and FIG. 5b shows the bright state transmission of the inventive switchable window element having a vertically aligned liquid crystal layer. The bright state of the inventive switchable window element is slightly less even than the bright state of the Heilmeier cell. However, the angle having the brightest transmission is large for the inventive switchable window element wherein the angle for the brightest transmission is narrow for the Heilmeier cell.

LIST OF REFERENCE NUMERALS 10 switchable window element
12 first polarizer layer
14 first retardation element
16 first electrode layer
18 first alignment layer
20 switchable layer
22 second alignment layer
24 second electrode layer
26 second retardation element
28 second polarizer layer
30 seal
32 first retardation layer
34 first substrate layer
36 second substrate layer
38 second retardation layer
40 optical path
42 interlayer
44 further substrate
50 first combined polarizer-retarder element
52 second combined polarizer-retarder element

The invention claimed is:
1. A switchable window element having a layer structure comprising in this order
    a first polarizer layer as first polarizer,
    a first retardation element as first optical retarder,
    a first electrode layer,
    a first alignment layer,
    the switchable layer,
    a second alignment layer,
    a second electrode layer,
    a second retardation element as second optical retarder, and
    a second polarizer layer as second polarizer wherein the first polarizer and the first optical retarder are arranged in an optical path prior to the switchable layer and the second polarizer and the second optical retarder are arranged in the optical path after the switchable layer, wherein the switchable layer is a vertically aligned liquid crystal layer comprising a liquid crystalline medium, wherein the product of the thickness d of the switchable layer and the optical anisotropy $\Delta n$ of the liquid crystalline medium is in the range of from 0.05 µm to 3.0 µm and the liquid crystalline medium has a clearing point above 100° C., wherein the switchable window is curved in space along two directions, and wherein the switchable window comprises at least one further substrate and at least one interlayer, wherein the at least one further substrate is connected to the first polarizer layer and/or second polarizer layer by means of the at least one interlayer, wherein the first optical retarder and/or the second optical retarder has an absolute value of an out of plane retardation Rth of from 1 nm to 1000 nm and/or an absolute value of an in plane retardation Re of from 1 to 300 nm, wherein the switchable window element has a dark state and a bright state and that switching between the states is achieved by applying an electric field to the switchable layer wherein the transmission of visible light through the switchable window element is less than 2% while in a-the dark state wherein the first alignment layer and/or second alignment layer is a homeotropic alignment layer, and wherein the vertically aligned molecules of the liquid crystalline medium are switched parallel to the plane of the layer structure by the application of an electric field that is perpendicular to the plane.

2. A switchable window element according to claim 1 which is a sunroof of a vehicle and is configured to be normally dark.

3. A switchable window element according to claim 1 which is a windshield of a vehicle or a window of a vehicle or a window of a building, and is configured to be normally in the bright state.

4. A switchable window element according to claim 1, wherein the first retardation element and/or the second retardation element is a layer structure comprising an optically isotropic substrate and a retardation layer.

5. A switchable window element according to claim 1, wherein the first retardation element and/or the second retardation element is a layer structure comprising an optically anisotropic substrate and a retardation layer.

6. A switchable window element according to claim 1, wherein the first retardation element and/or the second retardation element consists of an optically anisotropic substrate.

7. A switchable window element according to claim 4, wherein the optically isotropic substrate is selected from a glass or from a polymer.

8. A switchable window element according to claim 5, wherein the optically anisotropic substrate is selected from polyethylene terephthalate, cellulose triacetate and polycarbonate.

9. A switchable window element according to claim 1, wherein the switchable layer has a thickness d between 1 and 35 µm.

10. A switchable window element according to claim 1, wherein the liquid crystalline medium has an optical anisotropy $\Delta n$ in the range of from 0.03 to 0.3 for light having a wavelength of 589.3 nm and a dielectric anisotropy $\Delta \varepsilon$ of −0.5 to −20.

11. A switchable window element according to claim 1, wherein the first alignment layer and/or second alignment layer is a homeotropic alignment layer.

12. A switchable window element according to claim 11, wherein the homeotropic alignment layer is a polyimide-based layer.

* * * * *